United States Patent [19]

Wardlaw

[11] 4,422,862
[45] Dec. 27, 1983

[54] PROCESS FOR REUSING SCRAP GLASS

[75] Inventor: William G. Wardlaw, Anderson, S.C.

[73] Assignee: Owens-Corning Fiberglas Corporation, Toledo, Ohio

[21] Appl. No.: 357,496

[22] Filed: Mar. 12, 1982

[51] Int. Cl.³ .............................................. C03B 3/00
[52] U.S. Cl. .......................................... 65/28; 65/27; 65/134
[58] Field of Search ...................... 65/27, 28, 134, 17

[56] References Cited

U.S. PATENT DOCUMENTS

| 4,145,202 | 3/1979 | Grodin | 65/27 |
| 4,252,551 | 2/1981 | Nishimura | 65/134 X |
| 4,309,204 | 1/1982 | Brooks | 65/28 |

Primary Examiner—Arthur D. Kellogg
Attorney, Agent, or Firm—Ronald C. Hudgens; Patrick P. Pacella

[57] ABSTRACT

A process for feeding scrap glass to a glass melting furnace is disclosed. The scrap glass is fed onto a blanket of batch in the furnace so that organics are burned off before the scrap melts.

4 Claims, 2 Drawing Figures

PROCESS FOR REUSING SCRAP GLASS

TECHNICAL FIELD

This invention relates to a process and apparatus for recycling scrap glass to a glass melting furnace.

BACKGROUND ART

Before remelting scrap glass, organic binders and sizes on the surface of the glass must be removed. If this is not done, the glass will enclose the remaining binder in the form of carbon. Upon remelting, carbon will reduce the glass. This reduced darkened glass is undesirable for both glass composition and melting.

One method of doing this is to mill the scrap glass and blend it with granular raw batch before charging the batch to the furnace. It is important to ensure that oxidizing conditions are maintained in the glass melt within the furnace so that the glass furnace may feed a fiberizing process without harmful effects.

This process has many inherent disadvantages. For example, the scrap glass must be passed through a shredding operation and stored in a silo before blending with conventional granular batch. Further, the process demands that an entire glass furnace be kept at oxidizing conditions to ensure that carbonaceous material is removed.

Still another process for reusing scrap glass includes the steps of removing binders or sizes from the scrap glass, remelting the scrap glass and feeding the molten scrap directly into a furnace. Binder removal and melting of the scrap glass are carried out in a separate scrap remelt furnace.

This process also has many inherent disadvantages. Additional energy is required to pyrolize the organic binder and melt the scrap in the separate remelt furnace. Special heated platinum handling equipment is needed to transfer the molten scrap to a glass melting furnace.

DISCLOSURE OF INVENTION

I have developed a process that introduces scrap glass into a glass melting furnace with no preliminary washing, pyrolizing or melting of the cullet glass. The cullet glass does not have to be washed to remove binder resins or heated to burn off the binder. My process feeds the scrap glass onto the batch cover in the melting furnace. In a preferred embodiment, my process floats the cullet glass on the batch where organics are burned off before the cullet melts.

BEST MODE OF CARRYING OUT INVENTION

Figure 1:
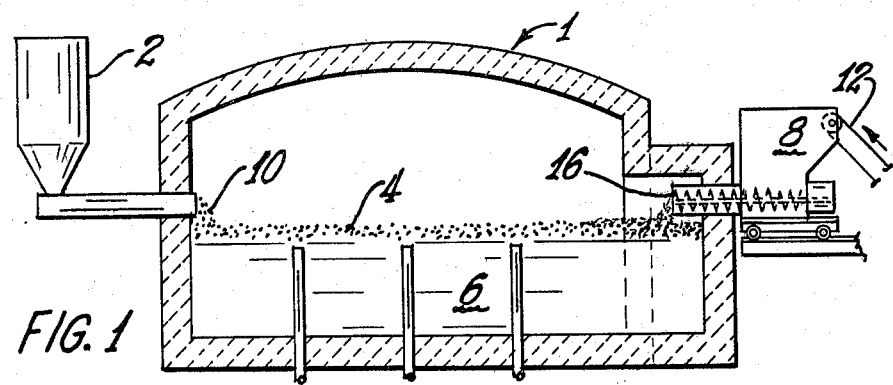
FIG. 1 illustrates a cross section of a conventional glass melting furnace being fed by a conventional batch feeder and the scrap glass feeder of this invention.

FIG. 1 is a cross section of a conventional textile furnace 1 constructed generally of refractory blocks, so as to include a conventional batch feeder 2. The batch forms a blanket 4 floating on the surface of molten glass 6.

Generally, there are two conventional batch feeders 2 on each side of furnace 1. Preferably, a cullet glass feeder 8 is positioned between each pair of conventional feeders. It should be understood that any number of conventional batch feeders and cullet feeders may be employed. Normally, a build-up of batch 10 occurs near but not adjacent to the side walls of furnace 1. Care must be taken to charge cullet glass from feeders 8 beyond the build-up of batch 10. Otherwise, the scrap glass will be trapped between the build-up of batch 10 and the sidewalls. If the entrapment occurs, the scrap glass will melt prematurely before the organics are burned off.

Figure 2:
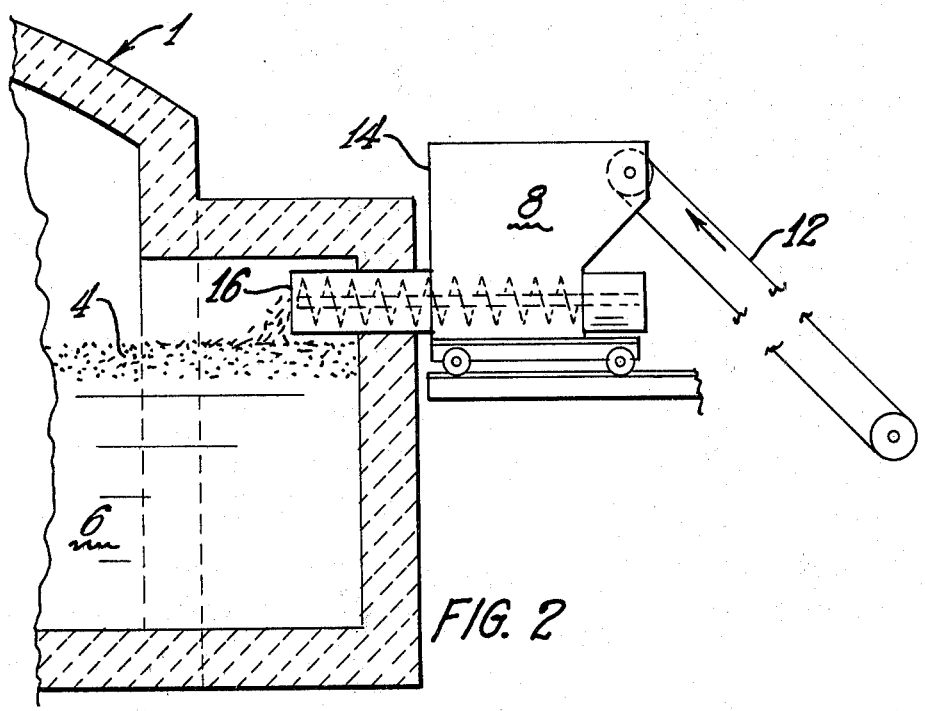
FIG. 2 is another view of the scrap feeder in position.

FIG. 2 shows scrap feeder 8 positioned against furnace 1.

Any form of glass may be used as cullet or scrap in this invention, e.g., broken glass as well as various forms of glass fibers.

INDUSTRIAL APPLICABILITY

Various trials were carried out. The rate of feeding cullet over the trials ranged from 300 to 1,000 pounds per hour. Later trials varied from 350 to 2,600 pounds per hour for a total of 227,000 pounds. There was no apparent difference in the forming room production or glass quality, e.g., no apparent difference in glass color or redox readings.

During the trials, glass fibers in the form of roving, chopped strand roving and on-line wet chop were used as cullet. The roving and chopped strand roving were dry products with less than 1% binder solids. The on-line wet chop contained 14% binder and water.

In an initial trial, cullet glass was fed through a conventional feeder. The glass floated on the surface for about eight minutes before melting. While the scrap glass floated on the raw batch, the binder seemed to burn off. For the first two or three minutes, there was visible smoke. After that, no smoke was visible.

In another trial, cullet glass was fed directly into the melter in the cold top area in the doghouse. One hundred pounds of wet chop per hour were fed into the melter between two convention batch chargers.

In another trial, scrap glass from the forming room basement hoppers were hammermilled and fed to the melter. The crushed glass looked promising; however, some long fibers in 8 to 10 inch range were observed.

In another trial, the volume was increased to 2,600 pounds per hour with total glass being fed being 42,000 pounds.

In still another trial, 91,000 pounds of glass was fed into the furnace at a rate of 500 pounds of glass per hour.

In FIG. 2, scrap glass is manually fed onto belt conveyor 12 at a controlled rate. The cullet glass previously has been processed through a crusher (not shown). The glass accumulates in bin 14 and is fed into the furnace through eight-inch water cooled screw conveyor 16. The crushing advantages are fluffy fine textured scrap that floats on the batch cover allowing good penetration and binder burn-off by furnace gases. Preferably, a large crusher with a collection system is employed. This would allow for the continuous or maximum feeding of cullet to the furnace. Care must be taken for the screw to extend into the furnace so that the scrap is not trapped against the sidewalls where it will melt before the binder is burned-off.

I claim:

1. A process for using scrap glass with organic material thereon including:

feeding unmelted glass batch to a glass melting furnace to form a blanket of the batch on the surface of molten glass in the furnace; and feeding unmelted scrap glass with organic material thereon on top of the blanket in the furnace independently of the batch, the scrap glass being fed so that the organic material is burned off before the scrap glass begins to melt.

2. A process for reusing scrap glass containing organics including the steps of:

feeding unmelted raw glass batch to a glass melting furnace which forms a blanket floating on the surface of the resulting molten glass;

feeding unmelted scrap glass on top of the raw glass batch blanket;

feeding the scrap glass independently of the raw batch feed; and floating the scrap glass on top of the raw glass batch blanket for a period of time sufficient to burn off the organics before the scrap glass begins to melt.

3. A process according to claims 1 or 2 wherein the scrap glass is hammermilled or crushed before it is fed to the glass melting furnace.

4. A process according to claims 1 or 2 wherein the scrap glass is in the form of fluffy, fine textured scrap that floats on the batch blanket.

* * * * *